(12) United States Patent
Coetzee et al.

(10) Patent No.: US 9,495,137 B1
(45) Date of Patent: Nov. 15, 2016

(54) METHODS AND SYSTEMS FOR IMPROVING RESPONSIVENESS OF ANALYTICAL WORKFLOW RUNTIMES

(71) Applicant: INTERNATIONAL BUSINESS MACHINES CORPORATION, Armonk, NY (US)

(72) Inventors: Peter L. Coetzee, Chester (GB); Anton V. Riabov, Ann Arbor, MI (US); Octavian Udrea, Valhalla, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/979,677

(22) Filed: Dec. 28, 2015

(51) Int. Cl.
G06F 9/45 (2006.01)

(52) U.S. Cl.
CPC ............. G06F 8/443 (2013.01); G06F 8/4441 (2013.01)

(58) Field of Classification Search
CPC ......................................... G06F 8/443–8/4441
USPC .................................................. 717/151–155
See application file for complete search history.

(56) References Cited

U.S. PATENT DOCUMENTS

| | | | | |
|---|---|---|---|---|
| 6,381,739 B1 * | 4/2002 | Breternitz, Jr. | ..... | G06F 11/3612 714/37 |
| 6,601,035 B1 * | 7/2003 | Panagos | ................. | G06Q 10/06 700/100 |
| 7,127,716 B2 * | 10/2006 | Jin | ........................ | G06Q 10/10 700/1 |
| 7,346,532 B2 * | 3/2008 | Kusama | ................. | G06Q 10/06 705/7.15 |
| 7,712,096 B2 * | 5/2010 | Kaczynski | ............ | G06F 9/5038 714/4.4 |
| 7,761,393 B2 * | 7/2010 | Macbeth | ................ | G06Q 10/10 706/16 |
| 7,822,658 B2 * | 10/2010 | Casati | ..................... | G06Q 10/10 705/35 |
| 8,271,757 B1 * | 9/2012 | Chatterjee | ............. | G06F 3/0605 711/114 |

(Continued)

OTHER PUBLICATIONS

AD Model Builder: using automatic differentiation for statistical inference of highly parameterized complex nonlinear models— David A. Fournier, Hans J. Skaug, Johnoel Ancheta, James Ianelli, Arni Magnusson, Mark N. Maunder , Anders Nielsen and John Sibert—Optimization Methods & Software vol. 27, No. 2, Apr. 2012, 233-249.*

(Continued)

*Primary Examiner* — Francisco Aponte
(74) *Attorney, Agent, or Firm* — Cantor Colburn LLP; Kurt Goudy

(57) ABSTRACT

Embodiments include methods, and computer program products of an analytical workflow system. Aspects include: observing analytical workflow patterns of one or more users to gather statistics, predicting an analytical workflow and parameter values likely to be requested in future based on the observations according to a compilation policy, applying a parameter generation policy and preparing the predicted analytical workflows according to the compilation policy, and executing analytical workflows and deploying the executed analytical workflows according to a deployment policy. The aspects also include: refining an analytical workflow specification, reusing prepared, executed or deployed analytical workflows, and terminating one or more prepared, executed or deployed analytical workflows when these analytical workflows are unlikely to be requested by a user in the near future according to a termination policy.

20 Claims, 2 Drawing Sheets

(56) References Cited

U.S. PATENT DOCUMENTS

| | | | | |
|---|---|---|---|---|
| 8,381,181 | B2* | 2/2013 | Davis | G06F 8/10 717/120 |
| 8,424,011 | B2* | 4/2013 | Barros | G06Q 10/06 717/104 |
| 8,443,351 | B2* | 5/2013 | Haselden | G06Q 10/10 717/149 |
| 8,527,973 | B2* | 9/2013 | Little | G06F 9/5027 717/149 |
| 8,782,602 | B2* | 7/2014 | Davis | G06F 8/10 717/120 |
| 8,914,781 | B2* | 12/2014 | Chilimbi | G06F 11/3447 717/104 |
| 8,972,952 | B2* | 3/2015 | Pizlo | G06F 8/443 717/128 |
| 8,973,013 | B2* | 3/2015 | Chen | G06F 17/3089 705/7.26 |
| 9,027,006 | B2* | 5/2015 | Pizlo | G06F 8/443 717/127 |
| 9,027,010 | B2* | 5/2015 | Barraclough | G06F 8/443 717/155 |
| 9,104,506 | B2 | 8/2015 | Bouillet et al. | |
| 9,189,212 | B2* | 11/2015 | Branson | G06F 8/423 |
| 9,253,070 | B2* | 2/2016 | Branson | G06F 8/423 |
| 9,256,410 | B2* | 2/2016 | Pizlo | G06F 8/443 |
| 9,304,808 | B2* | 4/2016 | Davis | G06F 8/10 |
| 2002/0174093 | A1* | 11/2002 | Casati | G06Q 30/02 |
| 2007/0094211 | A1* | 4/2007 | Sun | G06Q 10/06316 706/50 |
| 2010/0030896 | A1* | 2/2010 | Chandramouli | G06F 17/30516 709/224 |
| 2010/0318516 | A1* | 12/2010 | Kolen | G06F 17/30545 707/736 |
| 2012/0180030 | A1* | 7/2012 | Crutchfield | G06F 8/443 717/149 |
| 2012/0284069 | A1* | 11/2012 | Kemp | G06Q 30/0282 705/7.11 |
| 2013/0066646 | A1* | 3/2013 | Backhaus | G06Q 10/06 705/2 |
| 2013/0166888 | A1* | 6/2013 | Branson | G06F 9/30 712/220 |
| 2013/0205286 | A1* | 8/2013 | Barraclough | G06F 8/443 717/151 |
| 2014/0047423 | A1* | 2/2014 | Pizlo | G06F 8/443 717/153 |
| 2015/0281039 | A1* | 10/2015 | Branson | G06F 8/423 709/224 |
| 2015/0310188 | A1* | 10/2015 | Ford | G06F 21/10 726/28 |
| 2015/0363498 | A1* | 12/2015 | Brown | G06F 17/30595 707/722 |
| 2016/0042135 | A1* | 2/2016 | Hogan | G06F 19/345 705/2 |

OTHER PUBLICATIONS

Data Mining Techniques in Grid Computing Environments—Editor, Werner Dubitzky—University of Ulster, UK; This edition first published 2008 by John Wiley & Sons, Ltd.*

Optimizing Performance of Automatic Training Phase for Application Performance Prediction in the Grid—Farrukh Nadeem, Radu Prodan, and Thomas Fahringer Institute of Computer Science, University of Innsbruck Technikerstrase 21a, A-6020 Innsbruck, Austria—Springer-Verlag Berlin Heidelberg 2007.*

Next Generation Sequence Analysis and Computational Genomics Using Graphical Pipeline Workflows—Federica Torri, Ivo D. Dinov, Alen Zamanyan, Sam Hobel, Alex Genco, Petros Petrosyan, Andrew P. Clark, Zhizhong Liu, Paul Eggert, Jonathan Pierce, James A. Knowles, Joseph Ames, Carl Kesselman, Arthur W. Toga, Steven G. Potkin—Genes Aug. 2012.*

* cited by examiner

METHODS AND SYSTEMS FOR IMPROVING RESPONSIVENESS OF ANALYTICAL WORKFLOW RUNTIMES

STATEMENT REGARDING FEDERALLY SPONSORED RESEARCH OR DEVELOPMENT

This invention was made with Government support under Contract No: H98230-14D-0038 awarded by The Department of Defense. The Government has certain rights to this invention.

BACKGROUND

The present disclosure relates generally to information technologies, and more particularly to methods, systems and computer program products for improving responsiveness of analytical workflow runtimes.

Existing approaches to the composition and deployment of advanced analytic workflows over large-scale data sources often suffer a considerable latency between the user's completion of the design process and delivery of results from that analytic. This can be caused by the preparation of the analytic workflow for a platform including assembly, compilation, deployment and execution, or the analytic workflow complexity itself. This latency between composition of an analytic and delivery of its results is often on the scale of minutes—a considerable delay that prevents end-users from conducting exploratory data analysis efficiently.

One possible approach to mitigating this latency is through traditional software optimization, whether of the user-generated code, or of the underlying framework. Such optimizations are time consuming to implement, and typically significantly increase the complexity of the optimized code.

Therefore, heretofore unaddressed needs still exist in the art to address the aforementioned deficiencies and inadequacies.

SUMMARY

In an embodiment of the present invention, a method of improving responsiveness of analytical workflow runtimes may include: observing analytical workflow patterns of one or more users to gather statistics, predicting an analytical workflow and parameter values likely to be requested in future based on the observations according to a compilation policy, applying a parameter generation policy and preparing the predicted analytical workflows according to the compilation policy, and deploying prepared analytical workflows and executing the deployed analytical workflows according to a deployment policy. The aspects also include: refining an analytical workflow specification, reusing prepared, executed or deployed analytical workflows, and terminating one or more prepared, executed or deployed analytical workflows when these analytical workflows are unlikely to be requested by a user in the near future according to a termination policy.

In another embodiment of the present invention, an analytical workflow system may include one or more computers, each of the one or more computers may include at least one processor, and a memory storing computer executable instructions for the analytical workflow system. When the computer executable instructions are executed at the processor, the computer executable instructions cause the analytical workflow system to: observe analytical workflow patterns of one or more users to gather statistics, predict an analytical workflow and parameter values likely to be requested in future based on the observations according to a compilation policy, apply a parameter generation policy and prepare the predicted analytical workflows according to the compilation policy, and deploy the executed analytical workflows and execute analytical workflows according to a deployment policy. The computer executable instructions are also configured to: refine an analytical workflow specification, reuse prepared, executed or deployed analytical workflows, and terminate one or more prepared, executed or deployed analytical workflows when these analytical workflows are unlikely to be requested by a user in the near future according to a termination policy.

In yet another embodiment of the present invention, the present disclosure relates to a non-transitory computer storage medium. In certain embodiments, the non-transitory computer storage medium stores computer executable instructions. When these computer executable instructions are executed by a processor of an analytical workflow system, these computer executable instructions cause the analytical workflow system to: observe analytical workflow patterns of one or more users to gather statistics, predict an analytical workflow and parameter values likely to be requested in future based on the observations according to a compilation policy, apply a parameter generation policy and prepare the predicted analytical workflows according to the compilation policy, and deploy analytical workflows and execute the deployed analytical workflows according to a deployment policy. The computer executable instructions are also configured to: refine an analytical workflow specification, reuse prepared, executed or deployed analytical workflows, and terminate one or more prepared, executed or deployed analytical workflows when these analytical workflows are unlikely to be requested by a user in the near future according to a termination policy.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
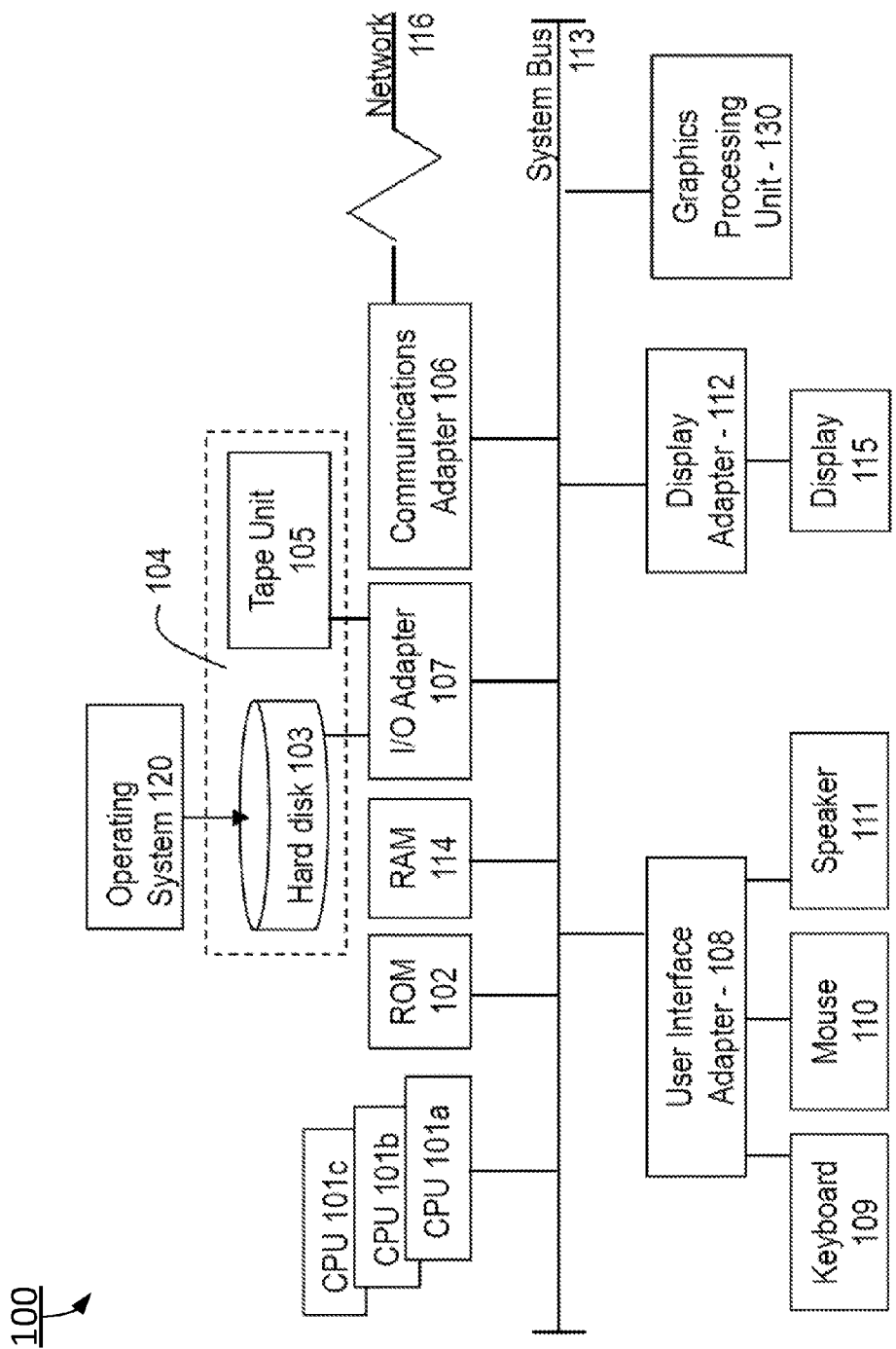
FIG. 1 is a block diagram illustrating an exemplary processing system of an analytical workflow system according to certain embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

"Analytical Workflow" is a process in which analysts mine, filter, pivot, and exploit data to try and find anomalies and ways to improve business processes.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-2, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, there is shown an embodiment of an analytical workflow system 100 for implementing the teachings herein. In this embodiment, the analytical workflow system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the analytical workflow system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the analytical workflow system 100 may be stored in mass storage 104. A network adapter 106 interconnects bus 113 with an outside network 116 enabling analytical workflow system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the analytical workflow system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the analytical workflow system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

In certain embodiments, the hard disk 103 stores software for an analytical workflow system for improving responsiveness of analytical workflow runtimes. The software may include, among other things, an active precomputation service module, and an analytical workflow assembly service module. In certain embodiments, when the analytical workflow assembly service module is executed at the processor 101, the analytical workflow assembly service module performs one or more of these operations: finding all possible analytical workflows matching a set of tags, preparing, assembling, compiling and deploying an analytical workflow described by the set of tags and a collection of parameters and their values, and providing a full set of possible tag combinations or all possible supersets of the given set of tags.

In exemplary embodiments, when the active precomputation service module is executed at the processor 101, the active precomputation service module performs one or more of these operations: gathering statistics about analytical workflows requested in the past, gathering information about the current state of the analytical workflow system, including partially completed (in progress) user requests, identifying analytic workflows and parameter values likely to be requested in the future, preparing and possibly deploying and executing a subset of workflows likely to be requested by the user, or user requested analytical workflows, identifying and reusing prepared and/or deployed and/or executed analytical sub-workflows, and terminating deployed and/or executed analytical workflows that are unlikely to be requested by a user in the near future.

Figure 2:
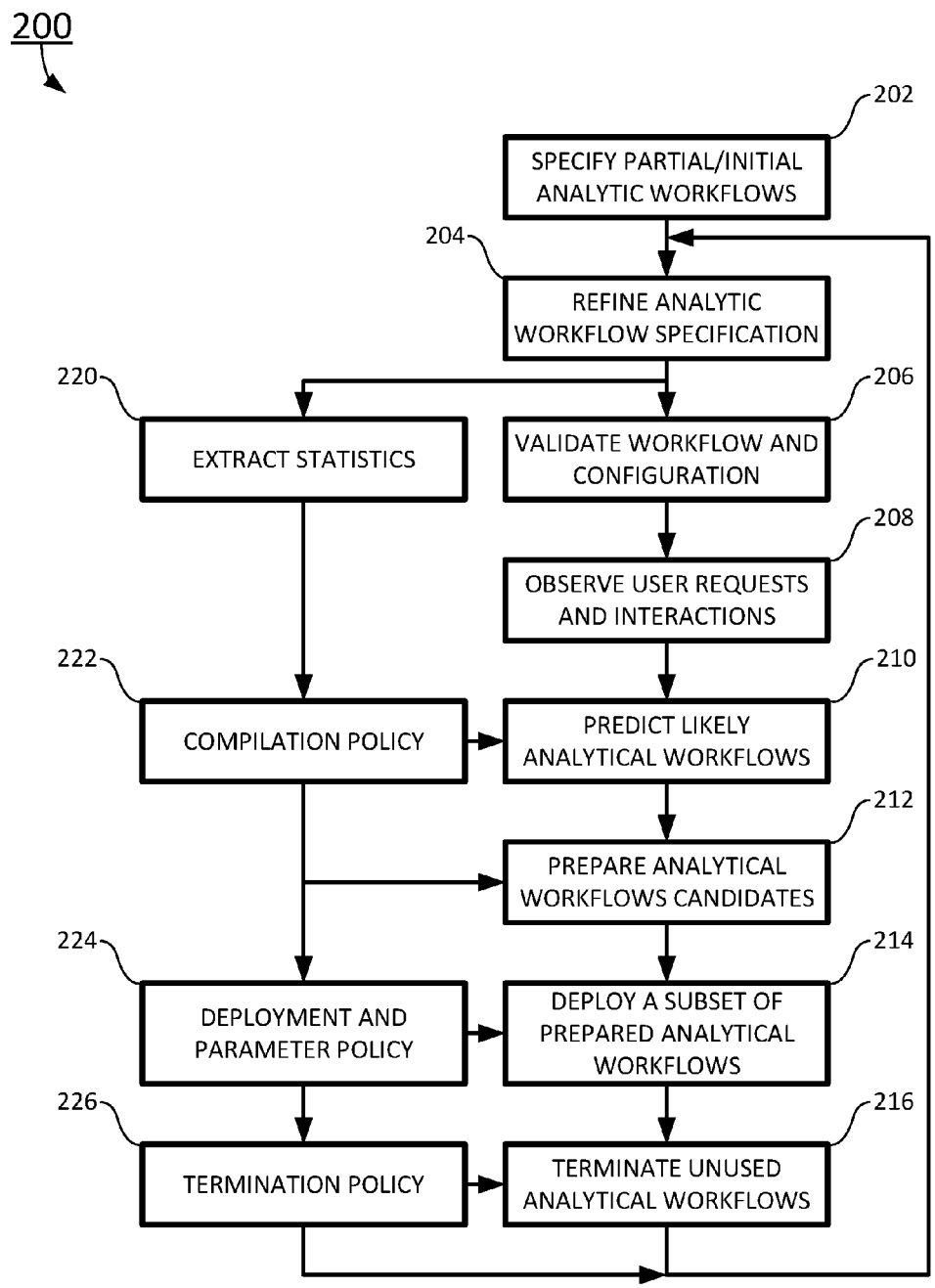
FIG. 2 is a flow chart of an exemplary method of improving responsiveness of analytical workflow runtimes of the analytical workflow system according to certain embodiments of the present invention.

Referring now to FIG. 2, a flow chart of an exemplary method 200 of an analytical workflow system is shown according to certain exemplary embodiments of the present disclosure. As shown at block 202, prior to the operation of the analytical workflow system 100, in one embodiment, a user may use the mouse 110, keyboard 109 to create an analytical workflow specification having initial and partial analytical workflows for the analytical workflow system 100. In another embodiment, the user may use the network 116 to import certain analytical workflow specification from other analytical workflow systems.

At block 204, once the analytical workflow system 100 is in operation, the analytical workflow specification may be updated or refined continuously here at block 204. For example, when certain unused analytical workflows are terminated by the active precomputation service module at block 216, those unused analytical workflows terminated are removed from the analytical workflows specification through block 204, and the analytical workflows specification is therefore updated and refined.

At block 220, the active precomputation service module may extract and gather statistics of the analytical workflows requested in the past, and gather information about the state of the analytical workflow system 100, including partially completed user requests. The statistics and information gathered may be transmitted back to block 204 to update and refine the analytical workflow specification, and to blocks 222, 224 and 216 to update the compilation policy, the deployment policy, the parameter generation policy, and the termination policy, respectively. The analytical workflow specification, and the compilation policy, the deployment policy, the parameter generation policy, and the termination policy are updated and refined in real time as the analytical workflow system 100 operates.

At block 206, the analytical workflow assembly service module may validate the analytical workflow specification, and collect further user-supplied configuration parameters. If the user is not satisfied with the analytic workflow's current state, the use may iteratively refine the specification they supply to analytical workflow assembly service module by adding and/or removing tags.

At block 208, the active precomputation service module may observe analytical workflow patterns of one or more users to gather statistics. The analytical workflow patterns of the users may include selected tags, tag sets, requested analytical workflows, and requested parameter values.

At block 210, the active precomputation service module may identify and predict analytical workflows and parameter values likely to be requested in the future, based on the observations from the block 208. The compilation policy in block 222 may be used for the prediction.

In certain embodiments, the compilation policy uses a combination of dimensions to create a ranked list of analytical workflows likely to be requested by the users and actively prepares a subset of M analytical workflows, where M is a tunable positive integer parameter. The combination of dimensions may include: the size of the predicted analytical workflows, which is the number of analytical components of the predicted analytical workflows, an intrinsic ranking of analytical workflow assembly service provided by the analytical workflow assembly service module, and frequency with which a predicted analytical workflow has been previously requested by a current user or by all users.

At block 212, the active precomputation service module may prepare and deploy a subset of the predicted analytical workflows for execution. Typically, the preparation involves assembly and compilation of analytic workflows on platforms that require it. Before the analytical workflows are prepared, the set of predicted analytical workflows can be filtered through various policies, for instance taking into account the resources needed to prepare a given workflow. The compilation policy in block 222 may be used for the preparation.

At block 214, when certain analytical workflows are requested by a user, the active precomputation service module may first identify certain analytical workflows that are already prepared, deployed, and/or executed. If the requested analytical workflows are already deployed and executed, the executed analytical workflows are directly sent to the requesting user. If the requested analytical workflows are already prepared, but not deployed or executed, then the prepared analytical workflows are then deployed and executed with the parameter values specified by the user. If the requested analytical workflows are neither prepared nor deployed or executed fully, the active precomputation service module checks whether a sub-workflow of the currently requested workflow is already prepared or executing in the runtime. If so, the user requested analytical workflows are modified to connect to the already running sub-workflows or to prepare only the part of the requested analytical workflow. Once these requested analytical workflows are prepared, deployed, and executed, these requested analytical workflows are added to a pool of prepared, deployed and executed analytical workflows, and the pool is updated, and the analytical workflow specification is also updated. Such updates are in real time as the analytical workflow system 100 operates.

The reuse of certain already prepared, deployed, and/or executed greatly improves the responsiveness of the analytical workflows runtimes.

In certain embodiments, a deployment policy from block 224 may be used to decide which prepared analytical workflows should be speculatively deployed and executed. For instance, one simple strategy is to always deploy and execute the most frequently requested analytical workflows from a set of prepared analytical workflows. In addition, since parameter values are required at deployment time, a parameter generation policy from block 224 may be used to pick values for the required parameters. A simple example is to always pick the most popular values for parameters that were previously requested by users.

In certain embodiments, the active precomputation service module uses the parameter generation policy to speculatively select a set of parameter values for the predicted analytical workflows. The set of parameter values may include P parameter values, and P is a tunable positive integer parameter. The parameter generation policy may include: random generation, frequency weighted generation, and top frequency generation. The active precomputation service module uses the random generation when the set of parameter values is selected from combinations of parameters at random. The active precomputation service module uses frequency weighted generation when the set of parameter values is selected with a random weight derived from the frequency with which a given parameter set has been observed before. The active precomputation service module uses the top frequency generation when the set of parameter values is selected based purely on the frequency with which they have been deployed.

In certain embodiments, the active precomputation service uses the deployment policy to select a subset of predicted analytical workflows to be prepared, and/or speculatively deployed and executed before a user request. The deployment policy may include: disabling all speculative deployment, deploying and executing all prepared analytical workflows, deploying and executing prepared analytical workflows at random, and deploying top N prepared analytical workflows, where N is a tunable positive integer parameter.

At block 216, a termination policy from block 226 determines when to terminate speculatively deployed or executed analytical workflows that are unlikely to be used or requested in the future. An example such policy can take the oldest executing workflows that are not in use either fully or partially, and terminate them to make room for new speculatively deployed workflows. The Analytical workflow system 100 may proceed to block 204 to update and refine the analytical workflow specification after the terminated analytical workflows are removed from the pool of predicted, prepared, executed, and/or deployed analytical workflows.

In certain embodiments, the active precomputation service module terminates certain prepared, executed, or deployed analytical workflows after these analytical workflows have not been used in a predetermined amount of time, or after these analytical workflows have not been used in a predetermined number of server operations.

In certain embodiments, the operations from block 204 through block 216 continue until the analytical workflow system 100 is terminated. The analytical workflow specification, the compilation policy, the deployment policy, the parameter generation policy, and termination policy are updated in real time as the analytical workflow system 100 operates.

In another embodiment of the present invention, an analytical workflow system may include one or more computers, each of the one or more computers may include at least one processor, and a memory storing computer executable instructions for the analytical workflow system. When the computer executable instructions are executed at the processor, the computer executable instructions cause the analytical workflow system to observe analytical workflow patterns of one or more users to gather statistics, predict one or more analytical workflows and parameter values likely to be requested in future based on the observations according to a compilation policy, prepare and execute the predicted analytical workflows according to the compilation policy, deploy, and execute the analytical workflows according to a deployment policy and a parameter generation policy. The computer executable instructions may also cause the analytical workflow system to refine an analytical workflow specification, reuse prepared, executed or deployed analytical workflows, and terminate one or more prepared, executed or deployed analytical workflows when these analytical workflows are unlikely to be requested by a user in the near future according to a termination policy.

In yet another embodiment of the present invention, the present disclosure relates to a non-transitory computer storage medium. In certain embodiments, the non-transitory computer storage medium stores computer executable instructions. When these computer executable instructions are executed by a processor of an analytical workflow system, these computer executable instructions cause the analytical workflow system to: observe analytical workflow patterns of one or more users to gather statistics, predict one or more analytical workflows and parameter values likely to be requested in future based on the observations according to a compilation policy and prepare the predicted analytical workflows according to the compilation policy, and deploy and execute the analytical workflows according to a deployment policy and a parameter generation policy. The computer executable instructions may also cause the analytical workflow system to: refine an analytical workflow specification, reuse prepared, executed or deployed analytical workflows, and terminate one or more prepared, executed or deployed analytical workflows when these analytical workflows are unlikely to be requested by a user in the near future according to a termination policy.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of improving responsiveness of analytical workflow runtimes comprising:
    observing analytical workflow patterns of one or more users to gather statistics;
    predicting a plurality of analytical workflows and parameter values likely to be requested in future based on the observations according to a compilation policy;
    applying a parameter generation policy and preparing the plurality of analytical workflows predicted according to the compilation policy, wherein an active precomputation service module uses the parameter generation policy to speculatively select a set of parameter values for the plurality of analytical workflows predicted, wherein the parameter generation policy comprises:
        random generation, wherein the set of parameter values is selected from combinations of parameters at random;
        frequency weighted generation, wherein the set of parameter values is selected with a random weight derived from the frequency with which a given parameter set has been observed before; and
        top frequency generation, wherein the set of parameter values is selected based purely on the frequency with which they have been deployed; and
    deploying the plurality of analytical workflows prepared and executing the plurality of analytical workflows deployed according to a deployment policy.

2. The method of claim 1 further comprising:
refining an analytical workflow specification;
reusing prepared, executed or deployed analytical workflows; and
terminating a plurality of prepared, executed or deployed analytical workflows when the plurality of prepared, executed or deployed analytical workflows is unlikely to be requested by a user in the near future according to a termination policy.

3. The method of claim 1, wherein the compilation policy uses a combination of dimensions to create a ranked list of analytical workflows likely to be requested by the users and actively prepares a subset of M analytical workflows, M being a tunable positive integer parameter, wherein the combination of dimensions comprises:
a size of the plurality of analytical workflows predicted, wherein the size of the plurality of analytical workflows predicted comprises a number of analytical components of the plurality of analytical workflows predicted;
an intrinsic ranking of workflows provided by an analytical workflow assembly service module; and
frequency with which a predicted analytical workflow has been previously requested by a current user and by all users.

4. The method of claim 1,
wherein the set of parameter values comprises P parameter values, and P is a tunable positive integer parameter.

5. The method of claim 4, wherein the active precomputation service module uses the deployment policy to select a subset of prepared analytical workflows to deploy and execute before a user request, wherein the deployment policy comprises:
disabling all speculative deployment;
deploying (and executing) all prepared analytical workflows;
deploying (and executing) prepared analytical workflows at random; and
deploying (and executing) top N prepared analytical workflows, wherein N is a tunable positive integer parameter.

6. The method of claim 5, wherein the active precomputation service module terminates deployed or executed analytical workflows after the deployed or executed analytical workflows have not been used in a predetermined amount of time or in a predetermined number of server operations.

7. An analytical workflow system comprising:
an analytical workflow assembly service module;
an active precomputation service module; and
one or more computers connected through a network, wherein each of the one or more computers comprises at least one processor, and a memory storing computer executable instructions for the analytical workflow system, wherein when executed at a processor of a computer of the one or more computers, are configured to:
observe analytical workflow patterns of one or more users to gather statistics;
predict a plurality of analytical workflows and parameter values likely to be requested in future based on the observations according to a compilation policy;
apply a parameter generation policy and prepare the plurality of analytical workflows predicted according to the compilation policy, wherein the active precomputation service module uses the parameter generation policy to speculatively select a set of parameter values for the predicted analytical workflows, wherein the parameter generation policy comprises:
random generation, wherein the set of parameter values is selected from combinations of parameters at random;
frequency weighted generation, wherein the set of parameter values is selected with a random weight derived from the frequency with which a given parameter set has been observed before; and
top frequency generation, wherein the set of parameter values is selected based purely on the frequency with which they have been deployed; and
deploy the plurality of analytical workflows prepared and executed the plurality of analytical workflows deployed according to a deployment policy.

8. The analytical workflow system of claim 7, wherein the computer executable instructions are configured to
refine an analytical workflow specification;
reuse prepared, executed or deployed analytical workflows; and
terminate a plurality of prepared, executed or deployed analytical workflows when the plurality of prepared, executed or deployed analytical workflows is unlikely to be requested by a user in the near future according to a termination policy.

9. The analytical workflow system of claim 7,
wherein the analytical workflow assembly service module is configured to
find all possible analytic workflows matching a set of tags;
prepare and deploy an analytic workflow described by a set of tags and a collection of parameters and their parameter values; and
provide a full set of possible tag combinations or all possible supersets of a given set of tags; and
wherein the active precomputation service module is configured to
gather statistics about analytical workflows requested in the past;
gather information about current state of the analytical workflow system, including partially completed user requests;
identify analytic workflows and parameter values likely to be requested in the future;
prepare and speculatively deploy a subset of workflows likely to be requested by the user;
identify and reuse subset of user requested analytical workflows, wherein the subset of user requested analytical workflows comprises prepared and deployed analytical workflows; and
terminate a plurality of deployed analytical workflows when the plurality of deployed analytical workflows are unlikely to be requested by a user in the near future according to a termination policy.

10. The analytical workflow system of claim 9, wherein the compilation policy uses a combination of dimensions to create a ranked list of analytical workflows likely to be requested by the users and actively prepares a subset of M analytical workflows, M being a tunable positive integer parameter, wherein the combination of dimensions comprises:
a size of the plurality of analytical workflows predicted, wherein the size of the plurality of analytical workflows predicted comprises a number of analytical components of the plurality of analytical workflows predicted;
an intrinsic ranking of workflows provided by the analytical workflow assembly service module; and frequency with which a predicted analytical workflow has been previously requested by a current user and by all users.

11. The analytical workflow system of claim 9, wherein the set of parameter values comprises P parameter values, and P is a tunable positive integer parameter.

12. The analytical workflow system of claim 9, wherein the active precomputation service module uses the deployment policy to select a subset of prepared analytical workflows to execute before a user request, wherein the deployment policy comprises:
   disabling all speculative deployment;
   deploying all prepared analytical workflows;
   deploying prepared analytical workflows at random; and
   deploying top N prepared analytical workflows, wherein N is a tunable positive integer parameter.

13. The analytical workflow system of claim 9, wherein the active precomputation service module terminates deployed analytical workflows after the deployed analytical workflows have not been used in a predetermined amount of time or in a predetermined number of server operations.

14. A non-transitory computer storage medium having computer executable instructions stored thereon which, when executed by a processor of a computer of an analytical workflow system, cause the processor to:
   observe analytical workflow patterns of one or more users to gather statistics;
   predict an analytical workflow and parameter values likely to be requested in future based on the observations according to a compilation policy;
   apply a parameter generation policy and prepare the plurality of analytical workflows predicted according to the compilation policy, wherein an active precomputation service module uses the parameter generation policy to speculatively select a set of parameter values for the predicted analytical workflows, wherein the parameter generation policy comprises:
      random generation, wherein the set of parameter values is selected from combinations of parameters at random;
      frequency weighted generation, wherein the set of parameter values is selected with a random weight derived from the frequency with which a given parameter set has been observed before; and
      top frequency generation, wherein the set of parameter values is selected based purely on the frequency with which they have been deployed; and
   deploy the plurality of analytical workflows prepared and execute the plurality of analytical workflows deployed according to a deployment policy.

15. The non-transitory computer storage medium of claim 14, wherein the computer executable instructions are configured to
   refine an analytical workflow specification;
   reuse prepared, executed or deployed analytical workflows; and
   terminate a plurality of prepared, executed or deployed analytical workflows when the plurality of prepared, executed or deployed analytical workflows is unlikely to be requested by a user in the near future according to a termination policy.

16. The non-transitory computer storage medium of claim 14, wherein the analytical workflow system comprises:

an analytical workflow assembly service module configured to
   find all possible analytic workflows matching a set of tags;
   prepare and deploy an analytic workflow described by a set of tags and a collection of parameters and their parameter values; and
   provide a full set of possible tag combinations or all possible supersets of a given set of tags; and
the active precomputation service module configured to
   gather statistics about analytical workflows requested in the past;
   gather information about current state of the analytical workflow system, including partially completed user requests;
   identify analytic workflows and parameter values likely to be requested in the future;
   prepare and speculatively deploy a subset of workflows likely to be requested by the user;
   identify and reuse subset of user requested analytical workflows, wherein the subset of user requested analytical workflows comprises prepared and deployed analytical workflows; and
   terminate a plurality of deployed analytical workflows when the plurality of deployed analytical workflows are unlikely to be requested by a user in the near future according to a termination policy.

17. The non-transitory computer storage medium of claim 16, wherein the compilation policy uses a combination of dimensions to create a ranked list of analytical workflows likely to be requested by the users and actively prepares a subset of M analytical workflows, M being a tunable positive integer parameter, wherein the combination of dimensions comprises:
   a size of the plurality of analytical workflows predicted, wherein the size of the plurality of analytical workflows predicted comprises a number of analytical components of the plurality of analytical workflows predicted;
   an intrinsic ranking of workflows provided by an analytical workflow assembly service module; and
   frequency with which a predicted analytical workflow has been previously requested by a current user and by all users.

18. The non-transitory computer storage medium of claim 16,
   wherein the set of parameter values comprises P parameter values, and P is a tunable positive integer parameter.

19. The non-transitory computer storage medium of claim 16, wherein the active precomputation service module uses the deployment policy to select a subset of predicted analytical workflows to execute before a user request, wherein the deployment policy comprises:
   disabling all speculative deployment;
   deploying all prepared analytical workflows;
   deploying prepared analytical workflows at random; and
   deploying top N prepared analytical workflows, wherein N is a tunable positive integer parameter.

20. The non-transitory computer storage medium of claim 16, wherein the active precomputation service module terminates deployed analytical workflows after the deployed analytical workflows have not been used in a predetermined amount of time or in a predetermined number of server operations.

* * * * *